8127X
J. Harriman.
Cook Stove.
Patented Mar. 31, 1834.
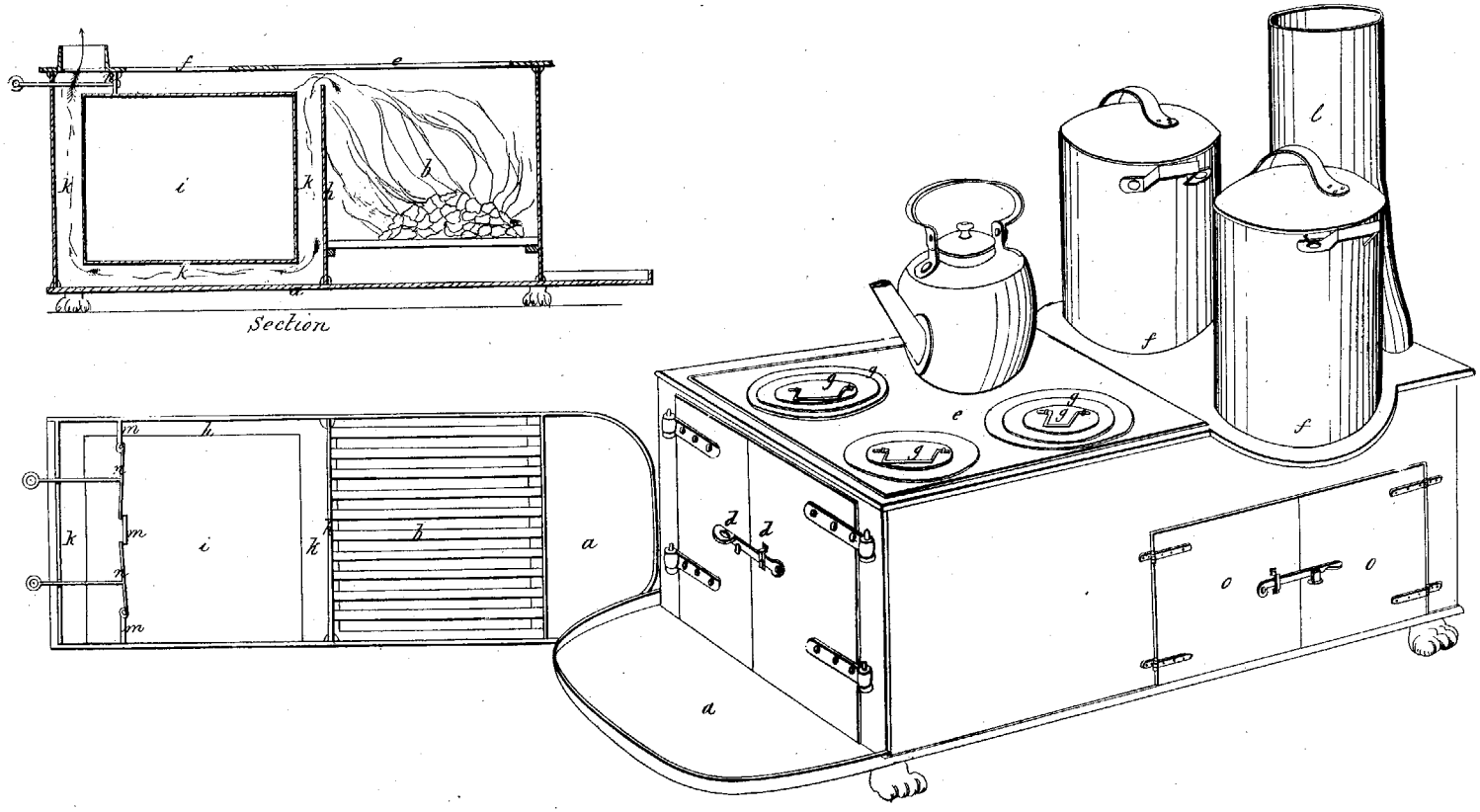
N. PETERS, PHOTO-LITHOGRAPHER, WASHINGTON, D. C.

Mar 31. 1834

8127X

John Harriman

The Schedule referred to in these Letters Patent and making part of the same containing a description in the words of the said John Harriman himself of his improvement in the manner of constructing Stoves for cooking and for other purposes.

To all whom it may concern. Be it known that I John Harriman of Haverhill in the County of Essex and State of Massachusetts have invented certain improvements in the manner of constructing Stoves for cooking and for other purposes and that the following is a full and exact description thereof. The principle part of the body of this Stove is to be made of Cast iron. The bottom plate forms the lap, the bottom of the fire place and of an oven situated behind it. The fire place is like that in many other stoves, being a deep open stove and having double doors in front, which may be closed when requisite. In the upper plate of the fire place I usually make three perforations for the reception of cooking utensils, the middle one large and furnished with concentric circular rings of different sizes to adapt it to different kinds of vessels. Near to the back end of this plate I make two other openings which may be either round or oval, and to give sufficient room for these, I swell out the said top plate and also the side plates of the fire place giving to it a curved form which is at the same time both ornamental and convenient There may if desired be other openings in the top, but these are all that I deem essential.

The oven is situated behind the fire place and is ~~[illegible]~~ in the form of a rectangular box, one side of which is against the back of the stove. The oven has a door or doors at one end, and it is formed with outer plates of cast iron and inner plates of sheet iron. This latter part is made

8127X made in a separate and distinct box so that it can be
drawn out whenever it requires to be repaired or renewed. It is
made so much smaller than the outer box as to admit a
space between the top bottom and sides, through which the
heated air and smoke are to pass in their passage to the pipe.
These escape from the fire through a throat or opening in the
upper part of the stove back and then pass down and under the oven,
thence ~~&c~~ ascending to the top where there is an opening for a
stove pipe. This opening is surrounded by a partition on
the top of the oven to prevent the heated air from passing over it with-
out going down and around it. in this partition there are valves
which may be opened when it is wished to direct any part of the
current over the oven. I intend sometimes to cover the top of the
inner portion of the oven with a cast iron plate, should the intensi-
ty of the heat render it necessary Instead of making openings directly
through the top plate of the oven for receiving cooking apparatus,
I make a rectangular opening the length of which may be twice
as great as its width, and adapt stew pans frying pans &c to
this opening. The plate which is to cover it when not wanted, to
be entirely open I perforate so as smaller cooking vessels when
required. By this arrangement boiling water for washing for cook-
ing meat or other articles by boiling as well as roasting, baking.
frying and broiling, may all be carried on together or any de-
sired number of them may be performed separately.

What I claim as my invention and wish to secure by Letters
Patent is the form given to the body of the stove for the pur-
pose of receiving the two smaller openings for vessels near its back
and two sides, the making the rectangular opening in the
outer top plate of the oven in the manner and for the purposes
set forth. the making the inner sheet iron oven so as to draw
out and the particular arrangement of the parts for attaining
these ends.

John Hawkins [illegible]

Witnesses Alfred P. Long? Wm. E. Ellis? [illegible]

[7 5 6 ?]

67. 119. C

[illegible]